US010473487B2

(12) United States Patent
Kegeler (10) Patent No.: US 10,473,487 B2
(45) Date of Patent: Nov. 12, 2019

(54) SENSOR ARRANGEMENT COMPRISING AN ANGLE SENSOR AND ROLLING BEARING ARRANGEMENT COMPRISING SENSOR ARRANGEMENT (71) Applicant: Schaeffler Technologies AG & Co. KG, Herzogenaurach (DE)

(72) Inventor: Jörg Kegeler, Schleusingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 31 days.

(21) Appl. No.: 15/573,159

(22) PCT Filed: Apr. 12, 2016

(86) PCT No.: PCT/DE2016/200179
§ 371 (c)(1),
(2) Date: Nov. 10, 2017

(87) PCT Pub. No.: WO2016/180411
PCT Pub. Date: Nov. 17, 2016

(65) Prior Publication Data
US 2018/0356254 A1    Dec. 13, 2018

(30) Foreign Application Priority Data

May 13, 2015   (DE) .......................... 10 2015 208 837

(51) Int. Cl.
*F16C 41/00*    (2006.01)
*G01D 5/20*    (2006.01)
(Continued)

(52) U.S. Cl.
CPC .......... *G01D 5/2046* (2013.01); *F16C 19/522* (2013.01); *F16C 41/007* (2013.01);
(Continued)

(58) Field of Classification Search
CPC ...... F16C 19/06; F16C 19/522; F16C 41/004; F16C 41/007; F16C 2233/00; G01P 3/42;
(Continued)

(56) References Cited

U.S. PATENT DOCUMENTS 5,191,284 A * 3/1993 Moretti ................... G01P 3/443
188/181 A
5,967,669 A * 10/1999 Ouchi ................... F16C 41/007
324/207.25
(Continued)

FOREIGN PATENT DOCUMENTS

DE    102010021160 A1    11/2011
DE    102012223942 A1    6/2014
(Continued)

*Primary Examiner* — Marcus Charles
(74) *Attorney, Agent, or Firm* — Kevin L. Parks (57) ABSTRACT A sensor arrangement comprising an angle sensor for measuring torsion is disclosed. The angle sensor is designed for carrying out a measurement via n poles, where n≥1, and primarily comprises a sensor ring which at least partially surrounds a rotational axis, and a material measure which is rotatable relative to this sensor ring. One transmitting coil and multiple receiver coils are situated on the sensor ring. A magnetic circuit is formed between the transmitting coil and the receiver coils, which magnetic circuit comprises the material measure and a pot core including two limbs. In this case, the material measure forms a variable reluctance in the magnetic circuit. At least one of the two limbs of the pot core is segmented in such a way that the limb comprises ring segments. Each of the receiver coils surrounds at least one of the ring segments. Each of the ring segments forms a circular arc having a mean radius. The ring segments may be provided in pairs. The mean radii of the two ring segments of the individual pairs have an angle ($\beta$) relative to each other of ($60°/n+i\cdot360°/n$), wherein i is a whole number. The disclosure further relates to a rolling bearing arrangement.

10 Claims, 6 Drawing Sheets

(51) Int. Cl.
*G01P 3/44* (2006.01)
*G01L 5/00* (2006.01)
*F16C 19/52* (2006.01)
*G01P 3/42* (2006.01)
*G01P 3/488* (2006.01)
*F16C 19/06* (2006.01)

(52) U.S. Cl.
CPC .......... *G01D 5/2006* (2013.01); *G01L 5/0023* (2013.01); *G01P 3/42* (2013.01); *G01P 3/443* (2013.01); *G01P 3/488* (2013.01); *F16C 19/06* (2013.01); *F16C 2233/00* (2013.01)

(58) Field of Classification Search
CPC ....... G01P 3/443; G01P 3/487; G01D 5/2086; G01D 5/2046; G01D 5/20; G01D 7/30; G01D 5/2006; G01L 5/0023; B62D 7/18
USPC ......... 384/446, 448, 456, 490; 324/173–174, 324/207.13, 207.18, 207.25
See application file for complete search history.

(56) References Cited

U.S. PATENT DOCUMENTS

| | | | | |
|---|---|---|---|---|
| 7,282,907 | B2* | 10/2007 | Inoue | G01D 5/2086 324/173 |
| 7,612,556 | B2* | 11/2009 | Inoue | F16C 19/184 324/173 |
| 9,127,718 | B2* | 9/2015 | Barcat | G01D 5/24433 |
| 9,267,960 | B2* | 2/2016 | Duppe | G01L 5/0023 |
| 2006/0043815 | A1* | 3/2006 | Miya | G01D 5/2046 310/216.001 |
| 2006/0075810 | A1* | 4/2006 | Gu | G01M 1/00 73/146 |
| 2006/0186627 | A1* | 8/2006 | Koyagi | F16C 19/184 280/93.512 |
| 2011/0074400 | A1* | 3/2011 | Nakano | G01D 5/2046 324/207.25 |
| 2012/0274316 | A1* | 11/2012 | Matsuura | G01D 5/2046 324/207.17 |
| 2013/0113470 | A1* | 5/2013 | Kegeler | G01B 7/30 324/207.25 |
| 2013/0162243 | A1* | 6/2013 | Ochiai | G01D 5/2046 324/207.16 |
| 2013/0193957 | A1 | 8/2013 | Zhou | |
| 2013/0271122 | A1* | 10/2013 | Kino | G01B 7/30 324/207.25 |
| 2014/0312885 | A1* | 10/2014 | Vellaiyanaicken | G01D 5/2046 324/207.25 |
| 2015/0337903 | A1* | 11/2015 | Kegeler | F16C 41/007 384/448 |

FOREIGN PATENT DOCUMENTS

| | | | | |
|---|---|---|---|---|
| DE | 102014210014 A1 * | 11/2015 | ............ | F16C 41/007 |
| JP | 2005076730 A * | 3/2005 | ............ | F16C 33/723 |
| JP | 2011151978 A * | 8/2011 | ............ | F16C 35/077 |
| WO | 2011134955 A2 | 11/2011 | | |
| WO | WO-2014037004 A1 * | 3/2014 | ............. | F16C 33/80 |

* cited by examiner

Fig. 1

PRIOR ART

Fig. 2

PRIOR ART

Fig. 3

PRIOR ART

SENSOR ARRANGEMENT COMPRISING AN ANGLE SENSOR AND ROLLING BEARING ARRANGEMENT COMPRISING SENSOR ARRANGEMENT

CROSS-REFERENCE TO RELATED APPLICATIONS

This application is the U.S. National Phase of PCT application Ser. No. PCT/DE2016/200179 filed Apr. 12, 2016, which claims priority to DE 102015208837.5 filed May 13, 2015, the entire disclosures of which are incorporated by reference herein.

TECHNICAL FIELD

The present disclosure relates to a sensor arrangement comprising an angle sensor for measuring torsion. The sensor arrangement may be a resolver. The disclosure also relates to a rolling bearing arrangement which includes the sensor arrangement according to the disclosure. The rolling bearing arrangement may be a resolver bearing.

BACKGROUND

A sensor arrangement of the type in question and a rolling bearing arrangement of the type in question are known from WO 2011/134955 A2 nationalized as U.S. Pat. No. 9,329,022. The rolling bearing arrangement of the type in question is shown in a perspective cross-sectional representation in the attached FIG. 2. The rolling bearing arrangement primarily comprises a rolling bearing 01, axially adjacently to which an angle sensor 02 is attached. The rolling bearing 01 comprises an inner ring 03 and an outer ring 06 which is rotatable about the inner ring 03 about a rotational axis 04. Rolling elements 07 in the form of balls are located between the inner ring 03 and the outer ring 06. The rolling elements 07 are held in a cage 08 (shown in FIG. 3). The space between the outer ring 06 and the inner ring 03 is sealed toward the outside by a sealing disk 09.

Figure 2:
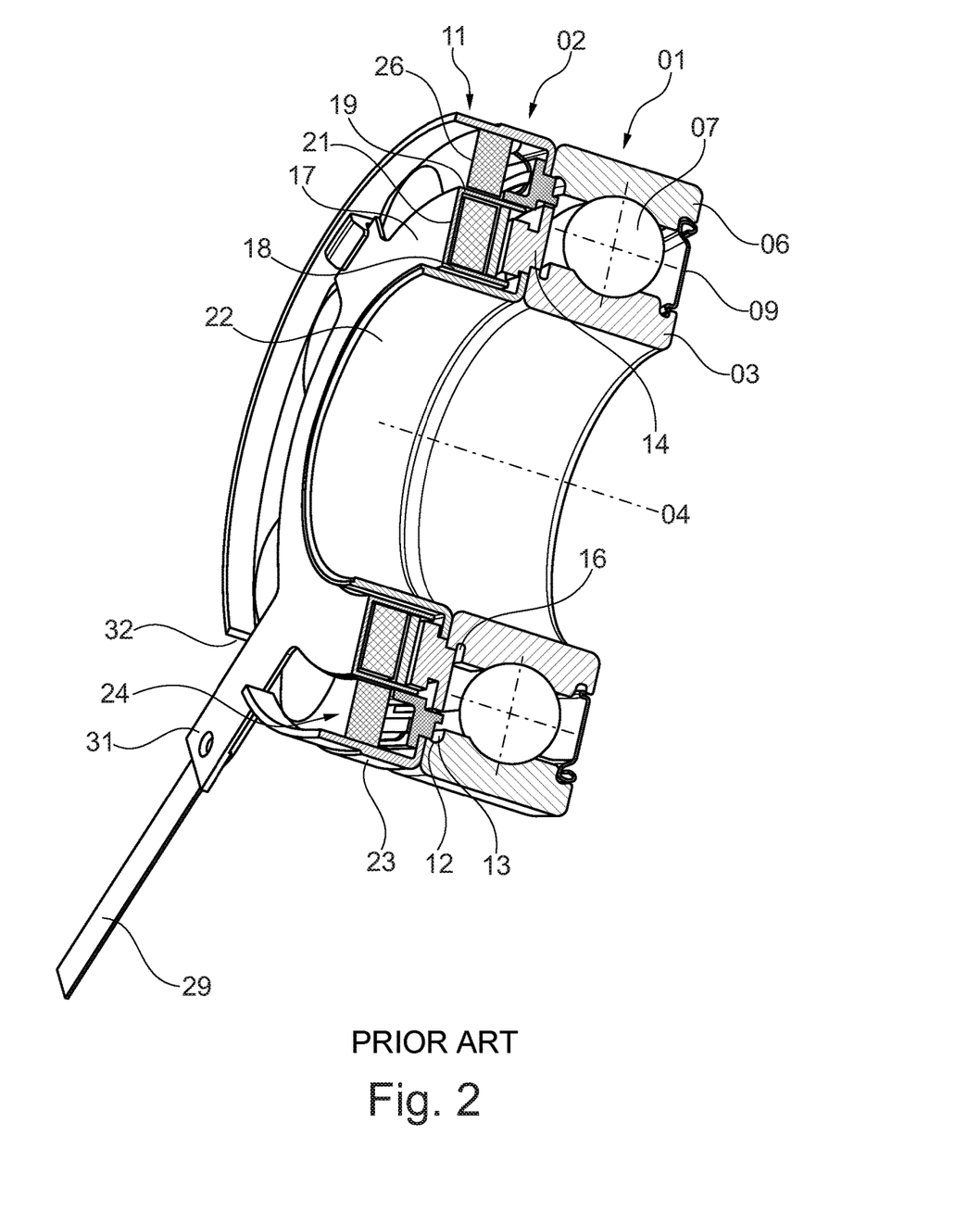
FIG. 2 shows a perspective cross-sectional representation of a rolling bearing arrangement of the type in question, according to the prior art.

The angle sensor 02 includes a sensor ring 11 which is fastened on the outer ring 06, with the aid of a holding element 12, in a peripheral groove 13 formed in the outer ring 06. In this case, the sensor ring 11 is not fastened on the outer ring 06 in a rotationally fixed manner, however, since the annular holding element 12 can rotate in the peripheral groove 13 about the rotational axis 04. The fastening is designed not to be rotationally fixed because the outer ring 06 is rotated slightly in the machine element (not shown) accommodating the outer ring 06 during a relatively long operation. The sensor ring 11 can retain its angular position on the rotational axis 04 due to the fact that the fastening is designed not to be rotationally fixed, and so the measurements carried out using the angle sensor 02 are not corrupted.

The angle sensor 02 also includes a material measure, or material element, 14 which is fastened to the inner ring 03 in a rotationally fixed manner in a peripheral groove 16 formed in the inner ring 03. The material measure 14 has an eccentric annular shape and is shown in detail in FIGS. 6 to 9. The material measure 14 closes the U-shaped cross-sectional shape of a U-shaped pot core 17 which is fastened in the sensor ring 11. The annular pot core 17 consists of a ferromagnetic material. The U-shaped cross-section of the pot core 17 forms a radially inner U-limb 18 and a radially outer U-limb 19 which are angled with respect to a U-base 21.

The sensor ring 11 includes an inner support ring 22 and an outer support ring 23, wherein an annular space 24, in which the pot core 17 and a circuit board 26 are located, is formed between the inner support ring 22 and the outer support ring 23. The circuit board 26 is shown in detail in FIG. 4. A transmitting coil 27 (shown in FIG. 4) and receiver coils 28 (shown in FIG. 4) are formed on the circuit board 26. The transmitting coil 27 and the receiver coil 28 can be electrically connected via a cable 29. The cable 29 is routed out of the annular space 24 via a cable holder 31 on the pot core 17 through a recess 32 in the outer support ring 23. The cable holder 31 is also used for fixing the pot core 17 and the circuit board 26 in a rotationally fixed manner with respect to the machine element (not shown) accommodating the rolling bearing arrangement.

Figure 3:
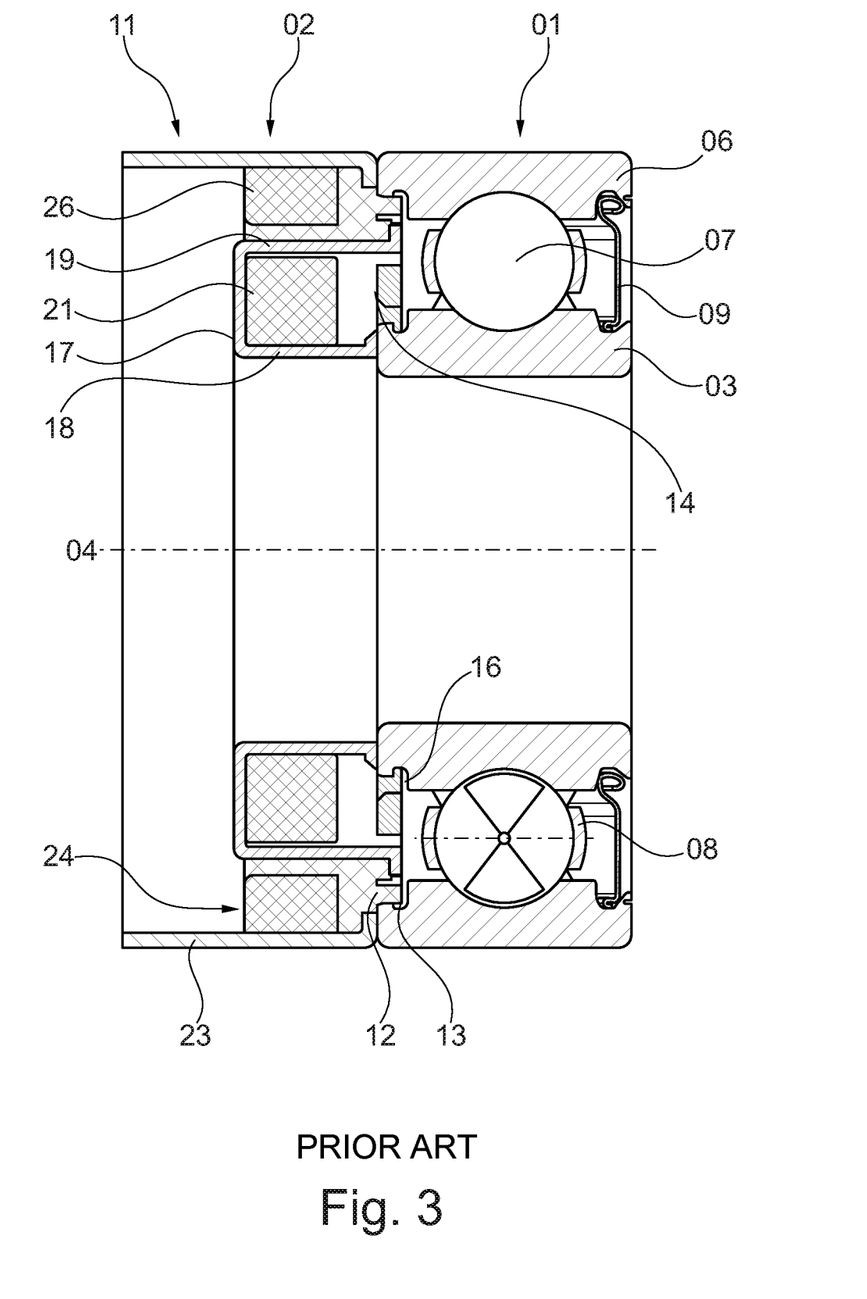
FIG. 3 shows a cross-sectional representation of the rolling bearing arrangement shown in FIG. 2.

FIG. 3 shows a cross-sectional representation of the rolling bearing arrangement shown in FIG. 2.

Figure 4:
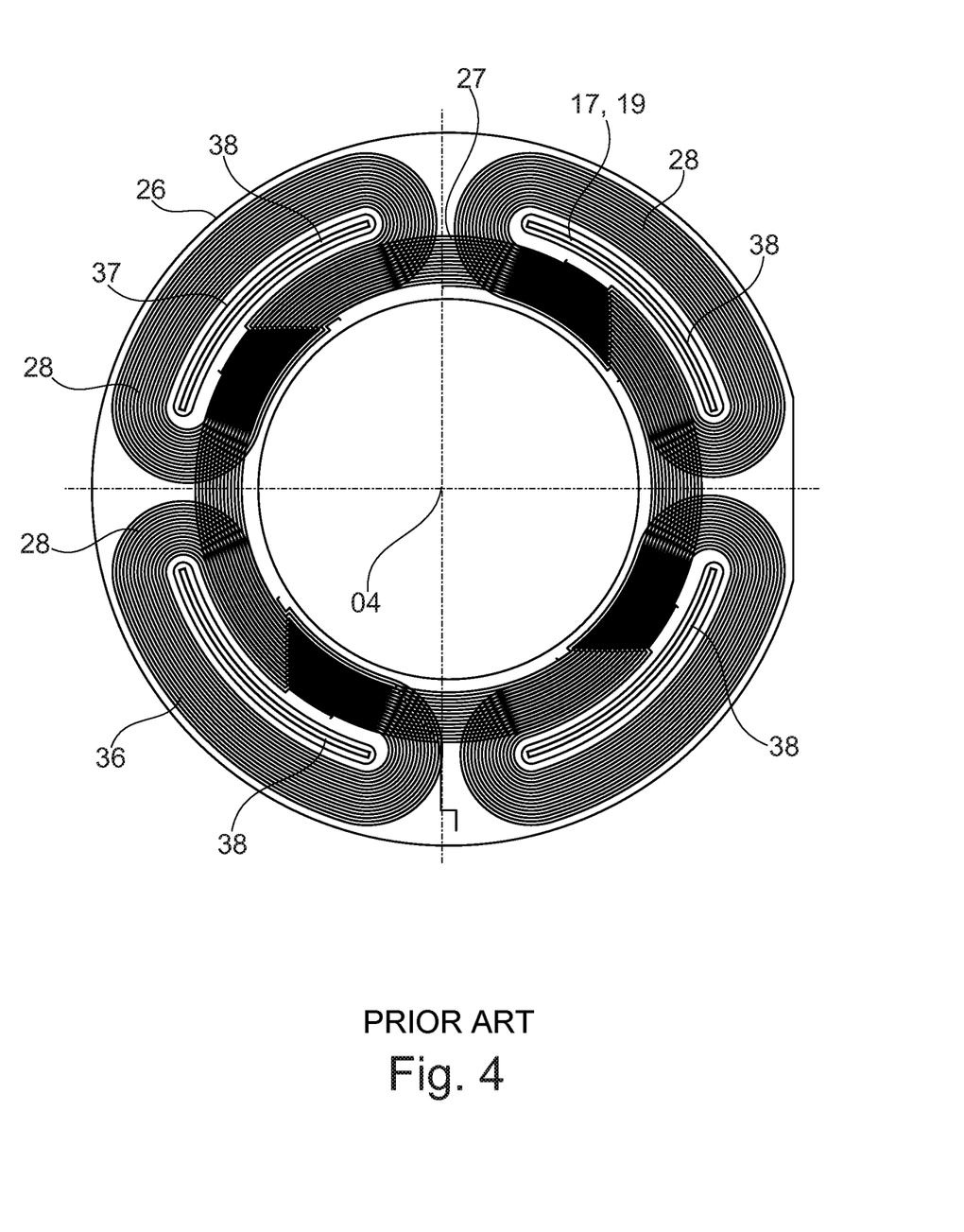
FIG. 4 shows a detailed representation of a circuit board shown in FIG. 2.

FIG. 4 shows, in detail, the circuit board 26 shown in FIG. 2. The transmitting coil 27 and the receiver coils 28 are formed on the circuit board 26. The circuit board 26 is a printed circuit board which has several layers, wherein the transmitting coil 27 and the receiver coil 28 are designed as strip conductors 36. The circuit board 26 comprises four evenly distributed and similarly designed openings 37. The openings 37 each have the shape of a circular ring segment. The circular ring segments each have a central angle of approximately 60°. The outer U-limb 19 of the pot core 17 is routed through the openings 37, and so the pot core 17 completely surrounds the transmitting coil 27, while said pot core surrounds each of the receiver coils 28 approximately only half-way. The outer U-limb 19, which is annular per se, has an interrupted annular shape, and so it can extend through the openings 37. Ring segments 38, each of which has the approximate shape of a circular arc, are formed due to the interruptions in the annular shape of the outer U-limb 19. The circular arcs each have a central angle of approximately 60°.

Figure 6:
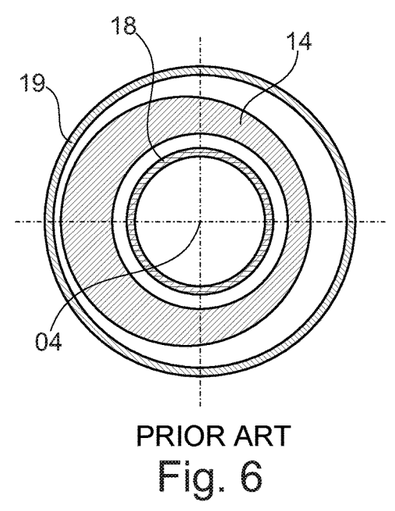
FIG. 6 shows a material measure of the type known from the prior art for the rolling bearing arrangement shown in FIG. 2.

FIG. 6 shows an embodiment of the material measure 14 of the type which is known for the rolling bearing arrangement from the prior art, which is shown in FIG. 2. The material measure 14 is represented in a cross-section perpendicular to the rotational axis 04, wherein the radially outer U-limb 19 and the radially inner U-limb 18 are also represented. During a twisting of the material measure 14 with respect to the pot core 17 (shown in FIG. 2), said material measure results in a variable reluctance of the magnetic circuit formed by the pot core 17 and the material measure 14 with respect to some of the receiver coils 28 (shown in FIG. 4), since the material measure 14 is eccentric. The eccentricity of the material measure 14 is due to the fact that a ring width of the annular material measure 14 changes around the periphery, namely from a minimum ring width toward a maximum ring width and back to the minimum ring width.

Figure 7:
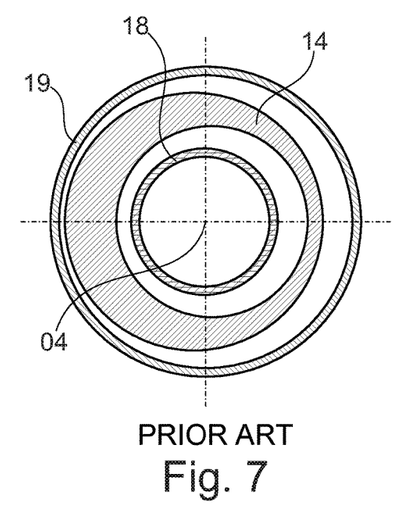
FIG. 7 shows the material measure shown in FIG. 2, in detail.

FIG. 7 shows, in detail, the material measure 14 shown in FIG. 2. In contrast to the material measure shown in FIG. 6, the material measure 14 in FIG. 7 has a double eccentric design, since both the outer circumference of the material measure 14 and the inner circumference of the material measure 14 are eccentric. As a result, the angle sensor 02 (shown in FIG. 2) is more insusceptible to displacements of the U-limbs 18, 19 perpendicularly to the rotational axis 04.

Figure 9:
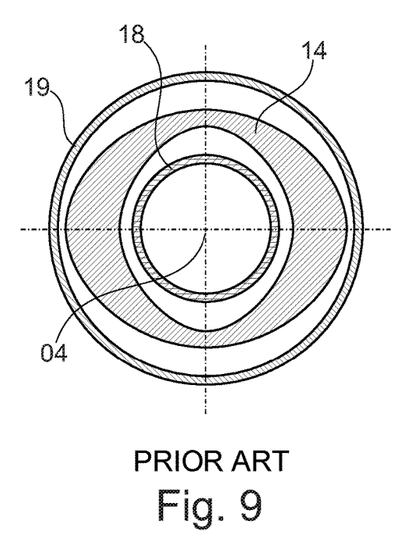
FIG. 9 shows a further material measure for a bipolar angle sensor according to the prior art.

The embodiment of the ring segments 38 (shown in FIG. 4) is not shown in the outer U-limbs 19 shown in FIG. 9 and FIG. 10.

The rolling bearing arrangement shown in WO 2011/134955 A2 allows for absolute angular measurements between 0° and 360°. As a result, it is suitable, for example, for supporting a shaft of a unipolar electric motor. The angle sensor 02 shown in FIGS. 2 to 4 is therefore also characterized as unipolar.

A sensor arrangement comprising a multipolar angle sensor is known from DE 10 2012 223 942 A1, which angle sensor is provided for carrying out measurements via n poles, and so angular measurements within rotational angles having the size 360°/n are made possible. The multipolar angle sensor is to be assigned to the same type as the angle sensor shown in WO 2011/134955 A2.

Figure 8:
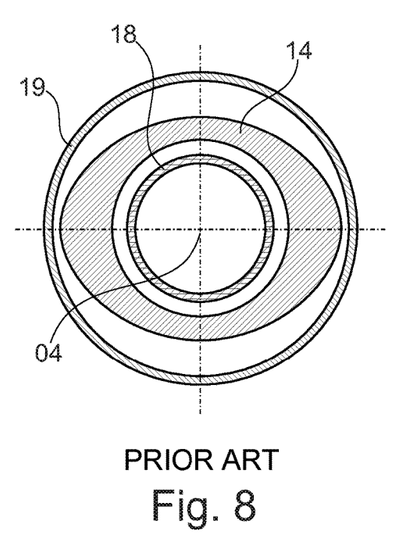
FIG. 8 shows a material measure for a bipolar angle sensor according to the prior art.

FIG. 8 shows a material measure 14 of the multipolar angle sensor known from DE 10 2012 223 942 A1. This is the material measure 14 of a bipolar angle sensor. The material measure 14 is eccentric, wherein a ring width of the annular material measure 14 along its circumference has two minima and two maxima.

FIG. 9 shows the material measure 14 of a further embodiment of the multipolar angle sensor known from DE 10 2012 223 942 A1. The material measure 14 shown in FIG. 9 differs from the material measure shown in FIG. 8 in that it has a double eccentric design.

SUMMARY

The problem addressed by the present disclosure, proceeding from the solutions shown in WO 2011/134955 A2 and DE 10 2012 223 942 A1, is that of providing a rolling bearing arrangement and a sensor arrangement suitable therefor, with the aid of which an angular measurement having an increased angular accuracy is made possible, in the case of which the error may be less than 1°.

The stated problem is solved by a sensor arrangement according to the features disclosed herein and by a rolling bearing arrangement including the sensor arrangement.

The sensor arrangement according to the disclosure includes an angle sensor and may be used for measuring torsion and rotations, wherein the angle characterizing the rotation or the torsion is the measured variable.

The angle sensor primarily includes a sensor ring which at least partially surrounds a rotational axis, and a material measure which is rotatable relative to this sensor ring. At least one transmitting coil and multiple receiver coils are situated on the sensor ring. A magnetic circuit, via which a signal can be transmitted, is formed between the transmitting coil and the receiver coils. The rotatable material measure forms a part of the magnetic circuit. In this case, the rotatable material measure forms a variable reluctance in the magnetic circuit with respect to individual receiver coils. As a result, the reluctance of the magnetic circuit changes for the individual receiver coils when the material measure rotates about the rotational axis. The change in the reluctance of the magnetic circuit is dependent on the rotational angle of the rotatable material measure.

The magnetic circuit is also formed by an annular pot core which preferably has a U-shaped cross-section in a plane including the rotational axis. The pot core preferably forms one component of the sensor ring, which is preferably fitted in the sensor ring in a rotationally fixed manner. The annular shape of the pot core is preferably situated coaxially to the rotational axis. The transmitting coil is situated within the pot core. The pot core comprises two limbs, each of which also has an annular shape. The material measure is designed as a ring which closes the magnetic circuit between the annular limbs of the pot core. The annular limbs are preferably formed coaxially to the rotational axis.

The receiver coils are each situated partially inside and partially outside the pot core. Consequently, the receiver coils are each located partially between the two limbs of the pot core. At least one of the two annular limbs of the pot core is segmented in such a way that the limb comprises ring segments. Preferably, at least the radially inner limb is segmented. The ring segments are preferably situated coaxially to the rotational axis. Each of the receiver coils encloses at least one of the ring segments of the pot core, wherein only the ring segments of one of the two annular limbs of the pot core are enclosed by the receiver coils. Each of the ring segments essentially has the shape of a circular arc. The ring segments have this shape in particular on a surface which is oriented toward the material measure and delimits an air gap to be formed. Each of the ring segments can have the shape of a narrow circular ring segment, in particular, which can be approximately considered to be a circular arc. In any case, each of the ring segments forms a circular arc, the center point of which lies in the rotational axis. Each of the circular arcs is characterized by a center point angle which describes the opening with respect to the center point. The angular position of the circular arc with respect to the rotational axis can be described with the aid of a mean radius which forms an axis of symmetry of the particular circular arc. The mean radius comprises the center point of the circular arc in the rotational axis and a central point on the circumference of the circular arc.

The angle sensor is designed for carrying out a measurement via n poles, wherein n is a natural number which is equal to 1 or is greater than 1. Therefore, this can be a unipolar angle sensor or a multipolar angle sensor. The angle sensor makes it possible to carry out absolute angular measurements within rotational angles having the size 360°/n. Angles greater than 360°/n can also be measured, of course; for example with the aid of incremental measurement steps. Preferably n=1, and so this is a unipolar angle sensor and absolute angular measurements within a rotational angle of 360° are made possible. Alternatively preferably, n>1, and so this is a multipolar angle sensor and absolute angular measurements within a rotational angle of 360°/n are made possible. These embodiments are suitable, in particular, for carrying out a measurement of rotational angles of a multipolar electric motor, wherein the angle sensor and the electric motor have the same number of poles. In this case, it is always known, via the control of the motor, in which of the n circumferential sections of the full circle the angle to be measured is formed.

According to the disclosure, the ring segments surrounded by the receiver coils are provided in pairs, wherein the mean radii of the two ring segments of the individual pairs have an angle with respect to each other of (60°/n+i·360°/n), wherein i is a whole number and preferably i≥0. At least those ring segments are provided in pairs that are formed on the one limb of the two annular limbs of the pot core whose ring segments are surrounded by the receiver coils. Consequently, this limb of the two annular limbs comprises multiple pairs of the ring segments. Each of the pairs comprises two of the ring segments whose mean radii have an angle relative to each other of (60°/n+i·360°/n). The ring segments provided in pairs can also be considered to be two arrangements of ring segments, wherein the two arrangements are offset (60°/n+i·360°/n) with respect to each other. Each of these two arrangements of ring segments already forms the ring segments necessary for a n-pole angle sensor. The ring segments can therefore be considered to be the ring segments of two n-pole angle sensors which are offset (60°/n+i·360°/n) with respect to each other relative to the rotational axis. The factor i is preferably equal to zero. The factor i is preferably equal to zero in the case n=1, in particular.

One advantage of the sensor arrangement according to the disclosure may be that it makes it possible to eliminate a main component of the systematic measuring error of the solutions known from the prior art. This main component results due to the non-linearity of the magnetic leakage field. This non-linearity typically appears in the measuring error as the third harmonic of the measuring signal. Due to the arrangement of the ring segments offset by 60°/n, complete insensitivity of the measuring signal with respect to this error component is achieved, independently of its absolute value.

In order to eliminate the aforementioned main component, it is provided in embodiments of the sensor arrangement according to the disclosure to surround the two ring segments of the individual pairs with one or more of the receiver coils, which is/are designed for additively converting magnetic fluxes flowing through the two ring segments of the particular pair into an induced electrical voltage. The result, therefore, is an addition of the magnetic fluxes flowing through the two ring segments of the particular pair or an addition of the voltages induced in the receiver coils. The third harmonic of the error component cancels itself out in this addition of the signals offset by 60°/n. Preferably, the two ring segments of each of the pairs of ring segments are surrounded by one or more of the receiver coils which is/are designed for additively converting magnetic fluxes flowing through the two ring segments of the particular pair into an induced electrical voltage.

In one embodiment, the two ring segments of the individual pairs are jointly surrounded by one of the receiver coils. As a result, the magnetic fluxes flowing through the two ring segments of the particular pair are added together, and so their sum results in the induction of an electrical voltage in the receiver coil surrounding the two ring segments. Preferably, the two ring segments of each of the pairs are jointly surrounded by one of the receiver coils.

In another embodiment, the two ring segments of the individual pairs are surrounded by one of the receiver coils in each case, and so two of the receiver coils are assigned to each of the pairs, wherein the two receiver coils of the individual pairs are electrically interconnected in series. Consequently, an electrical voltage is induced in the particular receiver coil by means of the magnetic fluxes flowing through the two ring segments of the particular pair, wherein the two induced voltages are added together by way of the series connection of the two receiver coils. Preferably, the two ring segments of each of the pairs are surrounded by one of the receiver coils in each case, and so two of the receiver coils are assigned to each of the pairs, wherein the two receiver coils of each of the pairs are electrically interconnected in series.

The two ring segments of the individual pairs may be identically designed. Preferably, the two ring segments of each of the pairs are identically designed.

The central angles of the circular arcs of the two ring segments of the individual pairs may be equal. Preferably, the central angles of the circular arcs of the two ring segments of each of the pairs are equal. In addition, the central angles of the circular arcs of the ring segments are preferably equal, and so the circular arcs of all ring segments have an identical central angle.

In some embodiments of the sensor arrangement according to the disclosure, there is a distance between angles between every two directly adjacent ring segments. Preferably, the distances between angles on the at least one segmented, annular limb of the pot core are equal. Due to the fact that all distances between angles are equal, it can be necessary for the central angles of the circular arcs of some of the ring segments to be dimensioned differently from the central angle of the circular arcs of the remaining ring segments.

In some embodiments of the sensor arrangement according to the disclosure, both of the annular limbs of the pot core are segmented, wherein each of the circular arcs of the ring segments of one of the two annular limbs has an angular position and a central angle that are identical to those of the circular arcs of the ring segments of the other of the two annular limbs. In this embodiment, the leakage fields are also compensated for in the tangential direction.

In one embodiment, only the ring segments of one of the two annular limbs of the pot core are surrounded by the receiver coils. For example, only the ring segments of the radially inner of the two annular limbs of the pot core may be surrounded by the receiver coils.

The receiver coils are preferably situated peripherally, relative to the rotational axis, along the segmented annular limb of the pot core. Each of the receiver coils is therefore situated the same distance away from the rotational axis. In one embodiment, the receiver coils are situated equidistantly, relative to the rotational axis, along the segmented annular limb of the pot core.

The material measure preferably has an annular cross-section perpendicularly to the rotational axis, and so it is formed by a ring which comprises n peripheral sections of equal length peripherally along its ring shape. In each of these peripheral sections, the extent of the ring width of the ring increases beginning with a minimum ring width up to a maximum ring width and decreases again down to the minimum ring width. As a result, an eccentric ring is formed, which has n maxima and n minima. The variable ring width can be effectuated by a variable outer radius of the ring or by a variable inner radius of the ring. Preferably, the ring has a variable inner radius as well as a variable outer radius, in order to effectuate the variable ring width. A double eccentric shape is achieved as a result.

Certain embodiments of the sensor arrangement according to the disclosure further include an evaluation unit for determining the angle. The evaluation unit is electrically connected to the receiver coils, and so signals of the receiver coils are received by the evaluation unit. The evaluation unit is preferably configured for redundantly processing the signals of the receiver coils assigned to the individual pairs of the ring segments. The evaluation unit can be situated inside or outside of the angle sensor.

The rolling bearing arrangement according to the disclosure primarily includes a rolling bearing comprising a first bearing ring and a second bearing ring which is rotatable relative to the first bearing ring. The rolling bearing arrangement further includes the sensor arrangement according to the disclosure, wherein the sensor ring is coupled to the first bearing ring, and wherein the material measure is connected to the second bearing ring in a rotationally fixed manner. Due to the coupling of the sensor ring to the first bearing ring, the sensor ring is connectable, in a rotationally fixed manner, to a machine element accommodating the first bearing ring. Consequently, the sensor arrangement is used for measuring a rotational angle between a machine element accommodated by the second bearing ring with respect to the machine element accommodating the first bearing ring.

Rolling elements are preferably situated between the first bearing ring and the second bearing ring.

The first bearing ring is preferably formed by an outer bearing ring, while the second bearing ring is preferably formed by an inner bearing ring.

BRIEF DESCRIPTION OF THE DRAWINGS

Further details, advantages, and refinements of the disclosure result from the following description of preferred embodiments of the disclosure, with reference to the drawings. In the drawings.

DETAILED DESCRIPTION

Figure 1:
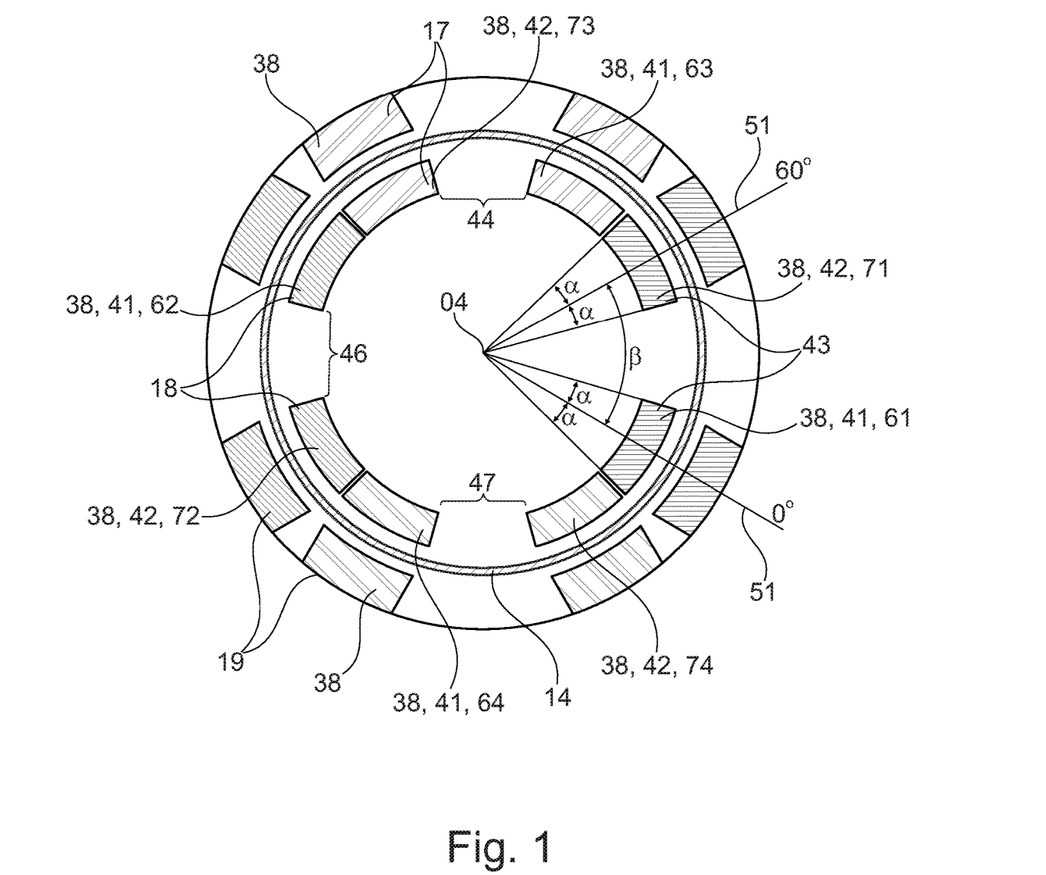
FIG. 1 shows a cross-sectional representation of an embodiment of a sensor arrangement according to the disclosure.

FIG. 1 shows a cross-sectional representation of an embodiment of a sensor arrangement according to the disclosure. A material measure 14 and a pot core 17, in particular, are shown in this cross-sectional representation. For the rest, this embodiment is identical to the sensor arrangement according to the disclosure in terms of its design of the angle sensor 02 shown in FIGS. 2 to 4, although it differs in terms of the design of the ring segments 38 (see FIG. 4) and the resultant arrangement of the receiver coils 28 (shown in FIG. 4). The sensor arrangement according to the disclosure also preferably forms a rolling bearing arrangement jointly with the rolling bearing 01 shown in FIG. 2.

The embodiment shown of the sensor arrangement according to the disclosure includes a unipolar angle sensor. The number of poles is therefore n=1. The rotatable material measure 14 has an eccentricity (not shown) and is designed, in particular, similarly to the material measures 14 shown in FIG. 6 and FIG. 7. The unipolar angle sensor is used for carrying out the absolute measurement of angles in the range of 0° to 360°.

In the embodiment shown, both the radial inner U-limb 18 and the radial outer U-limb 19 of the pot core 17 are segmented into the ring segments 38, wherein, according to the disclosure, only the U-limb of the two U-limbs 18, 19 whose ring segments 38 are surrounded by the receiver coils 28 must be segmented (shown in FIG. 4). In principle, either the ring segments 38 of the inner U-limb 18 or the ring segments 38 of the outer U-limb 19 are surrounded by the receiver coils 28 (shown in FIG. 4). Preferably, the inner U-limb 18 and the outer U-limb 19 of the pot core 17 are segmented into the ring segments 38 in the same way.

Each of the two U-limbs 18, 19 includes eight of the ring segments 38 which, together, form two ring segment arrangements 41, 42, each comprising four of the ring segments 38. Each of the two ring segment arrangements 41, 42 is already itself the arrangement of the ring segments 38 necessary for a unipolar angle sensor according to the prior art (shown in FIG. 2 to FIG. 4). According to the disclosure, two of the ring segment arrangements 41, 42 are formed, which are offset with respect to each other by a rotational angle of $\beta=60°/n=60°/1=60°$ relative to the rotational axis 04. For this reason, the ring segments 38 are provided on each of the two U-limbs 18, 19 in pairs. Four pairs 43, 44, 46, 47 of the ring segments 38 are provided. In each of the pairs 43, 44, 46, 47, the two ring segments 38 of the particular pair 43, 44, 46, 47 has an offset angle of $\beta=60°/n=60°/1=60°$ with respect to each other relative to the rotational axis 04. A mean radius 51 can be assigned to each of the circular segment-shaped ring segments 38. The mean radii 51 of the two ring segments 38 of each of the pairs 43, 44, 46, 47 also has the angle $\beta=60°/n=60°/1=60°$ with respect to each other.

All the ring segments 38 may have an identical central angle $2\cdot\alpha$. The two ring segments 38 of each of the individual pairs 43, 44, 46, 47 therefore extend symmetrically at an angle$\pm\alpha$ about the mean radii 51 which are situated at angular positions of 0° and 60°.

The receiver coils 28 (shown in FIG. 4) are preferably formed by sine coils and cosine coils. The terms "sine coil" and "cosine coil" are known from the prior art, for example from WO 2011/134955 A2. In the embodiment shown, the sine coils are formed in pairs (not shown), wherein each of the pairs of sine coils includes a positive sine coil and a negative sine coil. The signals that can be measured using the positive sine coil and the signals that can be measured using the negative sine coil during the rotation of the material measure 14 have an electrical period that represents a rotational angle between the material measure and the sensor ring of $360°/n=360°/1=360°$. The cosine coils are formed in pairs in the same way (not shown), wherein each of the pairs of cosine coils includes a positive cosine coil and a negative cosine coil. The signals that can be measured using the positive cosine coil and the signals that can be measured using the negative cosine coil during the rotation of the material measure 14 have an electrical period that represents a rotational angle between the material measure and the sensor ring of $360°/n=360°/1=360°$.

A first ring segment 61 of the first ring segment arrangement 41 and a first ring segment 71 of the second ring segment arrangement 42 are surrounded by the positive sine coil (not shown). A second ring segment 62 of the first ring segment arrangement 41 and a second ring segment 72 of the second ring segment arrangement 42 are surrounded by the negative sine coil (not shown). A third ring segment 63 of the first ring segment arrangement 41 and a third ring segment 73 of the second ring segment arrangement 42 are surrounded by the positive cosine coil (not shown). A fourth ring segment 64 of the first ring segment arrangement 41 and a fourth ring segment 74 of the second ring segment arrangement 42 are surrounded by the negative cosine coil (not shown).

Figure 5:
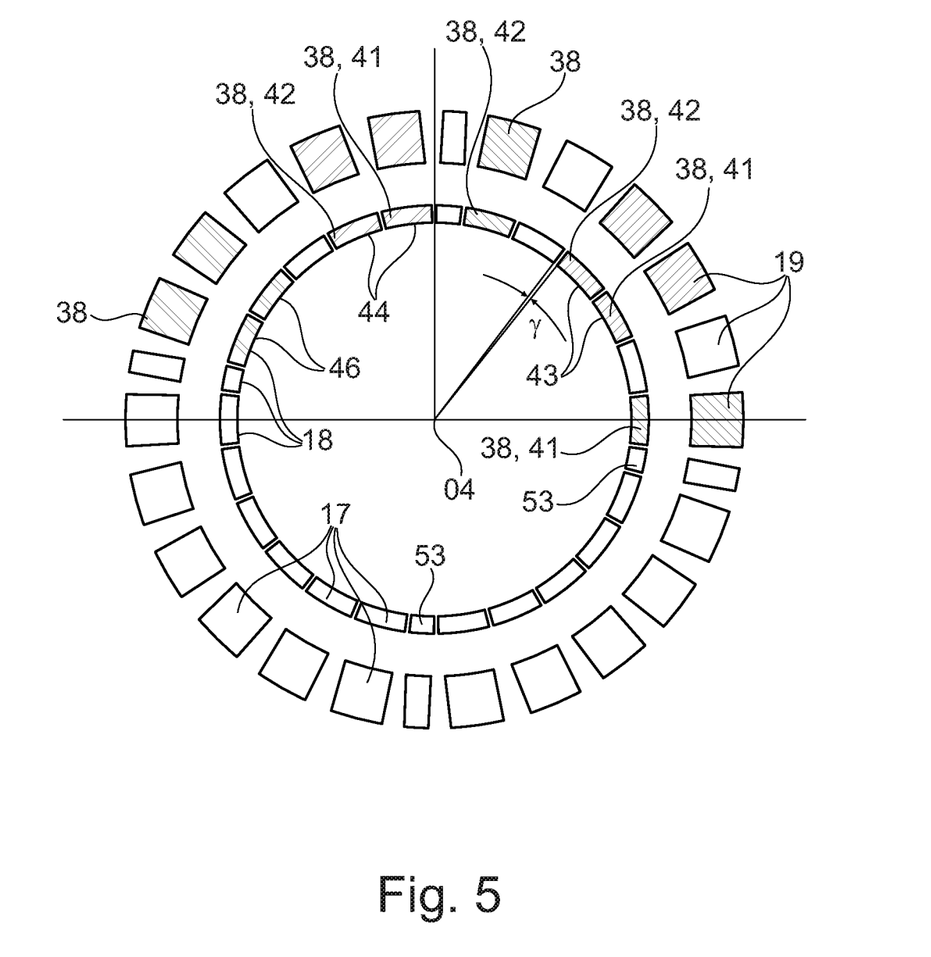
FIG. 5 shows a cross-sectional representation of a further embodiment of the sensor arrangement according to the disclosure.

FIG. 5 shows yet another embodiment of the sensor arrangement according to the disclosure, in a cross-sectional representation. The pot core 17, in particular, is shown in this cross-sectional representation. For the rest, this embodiment is identical to the sensor arrangement according to the disclosure in terms of its design of the angle sensor 02 shown in FIGS. 2 to 4, although it differs in terms of the design of the ring segments 38 (see FIG. 4) and the resultant arrangement of the receiver coils 28 (shown in FIG. 4).

The embodiment shown of the sensor arrangement according to the disclosure includes a four-pole angle sensor. The number of poles is therefore n=4. The rotatable material measure (not shown; see FIGS. 8 and 9) has an eccentricity having four maxima and four minima of their ring width. The four-pole angle sensor is used for carrying out the absolute measurement of angles in the range of 0° to 360°/4=90°.

In the embodiment shown, both the inner U-limb 18 and the outer U-limb 19 of the pot core 17 are segmented into the ring segments 38, wherein, according to the disclosure, only the U-limb of the two U-limbs 18, 19 that is surrounded by the receiver coils 28 must be segmented (shown in FIG. 4). In principle, either the ring segments 38 of the inner U-limb 18 or the ring segments 38 of the outer U-limb 19 are surrounded by the receiver coils 28 (shown in FIG. 4). Preferably, the inner U-limb 18 and the outer U-limb 19 of the pot core 17 are segmented into the ring segments 38 in the same way.

Each of the two U-limbs 18, 19 includes 26 of the ring segments 38 which, together, form two ring segment arrangements 41, 42, each comprising 13 of the ring segments 38. Each of the two ring segment arrangements 41, 42 is already itself the arrangement of the ring segments 38 necessary for a four-pole angle sensor according to the prior art. According to the disclosure, two of the ring segment arrangements 41, 42 are formed, which are offset with respect to each other relative to the rotational axis 04 by a rotational angle of β=60°/n=60°/4=15° or β=60°/n+3·360°/n=60°/4+270°=285°, respectively. For this reason, the ring segments 38 are provided on each of the two U-limbs 18, 19 in pairs. Four pairs 43, 44, 46, 47 of the ring segments 38 are provided. In three of the four pairs 43, 44, 46, the two ring segments 38 of the particular pair 43, 44, 46 have an offset angle of 60°/n=60°/4=15° with respect to each other relative to the rotational axis 04. In one of the four pairs 47, the two ring segments 38 of this pair 47 have an offset angle of β=60°/n+3·360°/n=60°/4+270°=285° with respect to each other relative to the rotational axis 04.

A distance between angles γ separates every two directly adjacent ring segments 38. All distances between angles γ on the inner U-limb 18 and on the outer U-limb 19 of the pot core 17 are equal. A few shortened ring segments 53 that have a smaller central angle than the remaining ring segments 38 are formed for this purpose.

The arrangement of the pairs 43, 44, 46, 47 of the ring segments 38 allows for a redundant evaluation of the determination of the angle to be measured. In the case of the multipolar angle sensor, all necessary signals can be generated in one circular ring sector having a central angle ≤180°, and so redundant signals are made available by utilizing a second circular ring sector. The redundant signals can be evaluated separately and they increase the functional reliability. This evaluation can take place outside of or inside the angle sensor.

LIST OF REFERENCE NUMBERS 01 rolling bearing
02 angle sensor
03 inner ring
04 rotational axis
05
06 outer ring
07 rolling element
08 cage
09 sealing disk
10
11 sensor ring
12 holding element
13 peripheral groove in the outer ring
14 material measure
15
16 peripheral groove in the inner ring
17 U-shaped pot core
18 inner U-limb
19 outer U-limb
20
21 U-base
22 inner support ring
23 outer support ring
24 annular space
25
26 circuit board
27 transmitting coil
28 receiver coils
29 cable
30
31 cable holder
32 recess in the outer support ring
35
36 strip conductors
37 openings in the circuit board
38 ring segments
40
41 first ring segment arrangement
42 second ring segment arrangement
43 pair of ring segments
44 pair of ring segments
45
46 pair of ring segments
47 pair of ring segments
50
51 mean radius
52
53 shortened ring segment
60
61 first ring segment of the first ring segment arrangement
62 second ring segment of the first ring segment arrangement
63 third ring segment of the first ring segment arrangement
64 fourth ring segment of the first ring segment arrangement
70
71 first ring segment of the second ring segment arrangement
72 second ring segment of the second ring segment arrangement
73 third ring segment of the second ring segment arrangement
74 fourth ring segment of the second ring segment arrangement
$2\sqrt{\alpha}$ central angle
β offset angle
γ distance between angles

The invention claimed is:

1. A sensor arrangement comprising:
an angle sensor, including a sensor ring which at least partially surrounds a rotational axis, and a material measure which is rotatable relative thereto;
wherein at least one transmitting coil and multiple receiver coils are situated on the sensor ring, wherein a signal is transmissible via a magnetic circuit between the transmitting coil and the receiver coils, and wherein the rotatable material measure forms a variable reluctance in the magnetic circuit;

wherein the transmitting coil is situated in an annular pot core forming one part of the magnetic circuit;

wherein the material measure is designed as a rotatable ring which closes the magnetic circuit between two annular limbs of the pot core;

wherein each of the receiver coils is situated partially inside and partially outside the pot core, wherein at least one of the two annular limbs of the pot core is segmented, and so it comprises ring segments, wherein each of the receiver coils surrounds at least one of the ring segments;

wherein each of the ring segments forms a circular arc relative to the rotational axis, wherein a mean radius each circular arc forms an axis of symmetry of the circular arc;

wherein the angle sensor is designed for a measurement via n poles, where $n \geq 1$; and wherein the ring segments are provided in pairs and the mean radii of the respective ring segments of the pairs have an angle ($\beta$) of ($60°/n + i \cdot 360°/n$) with respect to each other, and wherein i is a whole number.

2. The sensor arrangement as claimed in claim 1, wherein the respective ring segments of the pairs are surrounded by one or more of the receiver coils which are designed for additively converting magnetic fluxes flowing through the respective ring segments of a particular pair into an inducted electrical voltage.

3. The sensor arrangement as claimed in claim 2, wherein the respective ring segments of the pairs are jointly surrounded by one of the receiver coils.

4. The sensor arrangement as claimed in claim 2, wherein the respective ring segments of each of the pairs are surrounded by one of the receiver coils, and so two of the receiver coils are assigned to each of the pairs, wherein the two receiver coils of the pairs are electrically interconnected in series.

5. The sensor arrangement as claimed in claim 1, wherein each of the circular arcs of the ring segments has a central angle ($2 \cdot \alpha$), wherein the central angles ($2 \cdot \alpha$) of the circular arcs of the respective ring segments of the pairs are equal.

6. The sensor arrangement as claimed in claim 1, wherein a distance between angles ($\gamma$) is formed between every two adjacent ring segments, wherein the distances between angles ($\gamma$) on the segmented annular limb of the pot core are equal.

7. The sensor arrangement as claimed in claim 1, wherein both of the annular limbs of the pot core are segmented, wherein each of the circular arcs of the ring segments of one of the two annular limbs has an angular position and a central angle ($2 \cdot \alpha$) that are identical to those of the circular arcs of the ring segments of the other of the two annular limbs.

8. The sensor arrangement as claimed in claim 1, wherein only the ring segments of a radially inner of the two annular limbs of the pot core are surrounded by the receiver coils.

9. The sensor arrangement as claimed in claim 1, wherein said sensor arrangement further includes an evaluation unit which is electrically connected to the receiver coils in order to receive signals from the receiver coils, wherein the evaluation unit is configured for redundantly processing the signals of the receiver coils that are assigned to the pairs of the ring segments.

10. A rolling bearing arrangement including a rolling bearing comprising a first bearing ring and comprising a second bearing ring which is rotatable relative to the first bearing ring, wherein said rolling bearing arrangement further includes a sensor arrangement as claimed in claim 1, wherein the sensor ring is coupled to the first bearing ring, and wherein the material measure is connected to the second bearing ring in a rotationally fixed manner.

* * * * *